US008414797B2

(12) United States Patent
Howard et al.

(10) Patent No.: US 8,414,797 B2
(45) Date of Patent: Apr. 9, 2013

(54) SOLVENT SYSTEMS AND METHODS OF PRODUCING HIGH FLASH POINT SOLVENT SYSTEMS INCLUDING TERPENES

(75) Inventors: Harry W. Howard, Little Egg Harbor, NJ (US); William F. Rexer, Jr., Binghamton, NY (US)

(73) Assignee: Greensolve, LLC, Binghamton, NY (US)

( * ) Notice: Subject to any disclaimer, the term of this patent is extended or adjusted under 35 U.S.C. 154(b) by 0 days.

(21) Appl. No.: 13/344,973

(22) Filed: Jan. 6, 2012

(65) Prior Publication Data

US 2012/0175562 A1 Jul. 12, 2012

Related U.S. Application Data

(63) Continuation of application No. PCT/US2011/043154, filed on Jul. 7, 2011, which is a continuation-in-part of application No. 12/632,069, filed on Dec. 7, 2009, which is a continuation-in-part of application No. 12/361,802, filed on Jan. 29, 2009, now Pat. No. 7,998,366, application No. 13/344,973, which is a continuation-in-part of application No. 12/637,175, filed on Dec. 14, 2009, now Pat. No. 8,092,715.

(60) Provisional application No. 61/362,018, filed on Jul. 7, 2010, provisional application No. 61/391,213, filed on Oct. 8, 2010.

(51) Int. Cl.
*C09K 3/00* (2006.01)
*C10L 1/182* (2006.01)
*C11D 7/50* (2006.01)

(52) U.S. Cl. ............ 252/364; 252/182.29; 44/452; 44/451; 510/407

(58) Field of Classification Search ........... 252/364, 252/182.29; 44/302, 436, 451, 452; 510/407, 510/411; 138/38, 39, 40
See application file for complete search history.

(56) References Cited

U.S. PATENT DOCUMENTS

| | | | |
|---|---|---|---|
| 3,705,941 A | 12/1972 | Hennart et al. | |
| 3,867,526 A | 2/1975 | Hennart et al. | |
| 5,064,557 A * | 11/1991 | Fusiak | 510/188 |
| 5,098,591 A * | 3/1992 | Stevens | 510/106 |
| 5,393,451 A | 2/1995 | Koetzle | |
| 5,405,547 A | 4/1995 | Rinehart | |
| 5,425,893 A * | 6/1995 | Stevens | 134/1 |
| 5,597,788 A | 1/1997 | Stevens | |
| 6,187,736 B1 * | 2/2001 | Jarema | 510/245 |
| 6,843,812 B2 | 1/2005 | Stephanos | |
| 6,897,008 B1 | 5/2005 | Hendrickson et al. | |
| 7,166,664 B1 * | 1/2007 | Anderson | 524/474 |
| 7,176,174 B2 | 2/2007 | Filippini et al. | |
| 7,273,839 B2 | 9/2007 | Koetzle | |
| 7,309,684 B2 | 12/2007 | Filippini et al. | |
| 7,833,959 B1 * | 11/2010 | Koetzle | 510/407 |
| 7,998,366 B2 * | 8/2011 | Howard | 252/364 |
| 8,092,715 B2 * | 1/2012 | Howard | 252/364 |
| 2001/0053756 A1 * | 12/2001 | Jarema | 510/407 |
| 2002/0169090 A1 | 11/2002 | Foley et al. | |
| 2005/0100823 A1 | 5/2005 | Hendrickson et al. | |
| 2005/0197267 A1 | 9/2005 | Zaki et al. | |
| 2006/0019332 A1 | 1/2006 | Zhang et al. | |
| 2006/0081822 A1 * | 4/2006 | Koetzle | 252/601 |
| 2006/0128589 A1 * | 6/2006 | Shriner | 510/407 |
| 2008/0271761 A1 * | 11/2008 | Sherrel et al. | 134/42 |
| 2010/0187478 A1 * | 7/2010 | Howard | 252/364 |
| 2010/0247784 A1 | 9/2010 | Koetzle | |

FOREIGN PATENT DOCUMENTS

| | | |
|---|---|---|
| WO | 92/07038 A1 | 4/1992 |
| WO | 2008/105758 A1 | 9/2008 |

OTHER PUBLICATIONS

"Clean Cities of Middle Tennessee"; http://web.archive.org/web/20080405060339/http://www.tennesseecleanfuels.org/Methanol.html; Apr. 5, 2008; 2 pages.
"Cargill Dow and Ashland Sign Ethyl Lactate Agreement: Green Solvents from Renewable Resources"; Business Wire; http//www.allbusiness.com/electronics/electronics-overview/5935032-1.html; Apr. 23, 2002; 3 pages.
International Search Report and Written Opinion for PCT/US10/21350; dated Mar. 3, 2010; 7 pages.
International Search Report and Written Opinion for PCT/US10/60017, dated Aug. 25, 2011, 9 pages.
International Search Report and Written Opinion for PCT/US11/43154, dated Feb. 9, 2012, 11 pages.

* cited by examiner

*Primary Examiner* — Joseph D Anthony
(74) *Attorney, Agent, or Firm* — Brown & Michaels, PC

(57) ABSTRACT

Compositions and solvent mixtures include at least one organic solvent and at least one terpene. In some embodiments, the terpene is a monoterpene. In some embodiments, the terpene is pure gum turpentine, oil of turpentine, a component of turpentine, or a combination of these. In some embodiments, the organic solvent is acetone or a green solvent. Addition of a minimal amount of terpene to the organic solvent or organic solution raises the flash point of the mixture, preferably to a predetermined value. The predetermined value is preferably in the range of 110 to 120° F. The amount of terpene is preferably in the range about 0.05 to about 5 percent by total weight of the mixture. In some embodiments, the compositions are used as coatings, such as paints or adhesives. In some embodiments, at least one terpene is added to a lubrication formulation.

24 Claims, No Drawings

SOLVENT SYSTEMS AND METHODS OF PRODUCING HIGH FLASH POINT SOLVENT SYSTEMS INCLUDING TERPENES

REFERENCE TO RELATED APPLICATIONS

This is a continuation patent application of PCT/US2011/043154, filed Jul. 7, 2011, entitled "SOLVENT SYSTEMS AND METHODS OF PRODUCING HIGH FLASH POINT SOLVENT SYSTEMS INCLUDING TERPENES", which claims one or more inventions which were disclosed in Provisional Application No. 61/362,018, filed Jul. 7, 2010, entitled "SOLVENT SYSTEMS AND METHODS OF PRODUCING HIGH FLASH POINT SOLVENT SYSTEMS INCLUDING TERPENES" or Provisional Application No. 61/391,213, filed Oct. 8, 2010, entitled "FORMULATIONS AND METHODS FOR RAISING THE FLASH POINT OF VOLATILE ORGANIC SOLVENTS USING TERPENES OR TURPENTINE".

This is also a continuation-in-part patent application of U.S. patent application Ser. No. 12/632,069, filed Dec. 7, 2009, now Allowed entitled "METHOD OF RAISING THE FLASH POINTS AND IMPROVING THE FREEZE RESISTANCE OF VOLATILE GREEN SOLVENTS", which is a continuation-in-part patent application of U.S. patent application Ser. No. 12/361,802, filed Jan. 29, 2009, now U.S. Pat. No. 7,998.366 entitled "METHOD OF RAISING THE FLASH POINT OF VOLATILE ORGANIC COMPOUNDS".

This is also a continuation-in-part patent application of U.S. patent application Ser. No. 12/637,175, filed Dec. 14, 2009, now U.S. Pat. No. 8,092,715 entitled "FORMULATIONS AND METHODS FOR RAISING THE FLASH POINTS OF VOLATILE ORGANIC SOLVENTS". The benefit under 35 USC §119(e) of the United States provisional applications is hereby claimed, and the aforementioned applications are hereby incorporated herein by reference.

BACKGROUND OF THE INVENTION

1. Field of the Invention

The invention pertains to the field of solvent systems. More particularly, the invention pertains to a solvent system including at least one terpene.

2. Description of Related Art

The U.S. federal government has assigned to the Environmental Protection Agency (EPA) the responsibility of regulating man-made volatile emissions, which may pollute the air and atmosphere. The EPA has listed a group of VOCs as "Exempt VOCs", which is published in the Federal Register under 40 CFR 51.100(s), which is hereby incorporated by reference herein, and addendums. All other VOCs are restricted for use and weight-limited for emission discharge into the atmosphere and environment. Formulators and compounders of products using VOCs are challenged to use and obtain the required VOC combinations for use in their products, to comply with toxic emissions, and to provide for safety in manufacturing, shipping, storage, and ultimate use. VOCs are further sub-classified based upon their vapor pressures, boiling points, and flash points. The flash point of the VOC becomes a critical factor for emission discharge and safety, because it is critical because it is the point at which the liquid becomes a volatile vapor, mixes with oxygen, and thereby acquires its most combustible or flammable state. Flash point, as used herein, refers to the lowest temperature at which a volatile liquid can vaporize to form an ignitable mixture in air. In the United States, the Environmental Protection Agency (EPA) and the Department of Transportation (DOT) have classified such compounds based on their volatilities or "flash points".

The current EPA and DOT Volatile Organic Compound ("VOC") classifications are as follows:

| | |
|---|---|
| Class I liquids (flammable) | flash point at or below 100° F. |
| Class II liquids (combustible) | flash point from 100° F. to below 140° F. |
| Class III liquids (combustible) | flash point above 140° F. to below 200° F. |

International standards are generally stricter, with 43° C. (109.4° F.) generally being the separation point between flammable and combustible liquids.

There are currently six commonly used exempt VOCs on the U.S. federal list of acceptable VOCs. Of the six, four have flash points below 10° C./50° F. and they are therefore classified as "flammable and hazardous", thus rendering their respective use to safe and unpopulated areas. P-Chlorobenzotrifluoride (PCBTF) has a "combustible" flash point rating of 43° C./109° F., and propylene carbonate lists as "combustible" with a flash point of 107.8° C./226° F.

Organic solvents, such as acetone, xylene, ketones, esters, ethers, aliphatic hydrocarbons, and aromatic hydrocarbons such as benzene, are widely used as additives for industrial and commercial purposes. Due to the high volatility of these compounds, their uses are regulated by many countries' governmental agencies. Obviously, the more flammable a solvent, the more restrictions exist on its use. Further, manufacturers that utilize solvents must handle the more flammable liquids more carefully and have to address issues involving atmospheric volatility and worker health concerns due to excessive exposure to these chemicals. If these solvents can be modified so that their flash points can be increased, this would result in significantly more uses for these compounds as well as increasing their shelf lives. It is desirable therefore to increase the flash point of a variety of solvents without substantially increasing the cost of the solvent while maintaining the solvent and its utility and effectiveness for its purpose.

"Green" solvents are regarded as such because of their sources of origin (non-petroleum based) and the fact that they biodegrade readily after use without environmental damage. Green solvents include, but are not limited to, certain alcohols such as methanol, ethanol, benzyl alcohol, certain acetates, certain esters, and turpentine. The problem with these solvents, however, is that due to their high volatility, they are considered hazardous air pollutants which violate Federal and State emissions regulations. Ethyl lactate, one example of a green solvent, has a flash point of about 115° F., which despite not being considered a Class I VOC, is still combustible, which limits its potential uses. Green esters, such as N-butyl propionate, ethyl lactate, and methyl soyate, are also considered combustible, with flash points ranging from 115° F. up to 250° F. However, they are slow to evaporate and exhibit good solvating characteristics when used in blended compositions. Nevertheless, this group of solvents is considered environmentally clean and could be utilized more extensively if their volatilities could be reduced.

The growing environmental concerns over the use of petroleum lubricants for industrial and transportation needs has expanded the uses of oleochemicals, vegetable oils, and recyclables for use as alternative lubricants. Environmental concerns and efforts toward resource renewability, biodegradability, and utility have led to the introduction and use of vegetable oils and synthetic esters. Of the major candidates considered, coconut oil, hydro-processed mineral oil, rapeseed (canola) oil, soy methyl esters, palm oil, and recyclable vegetable oils have been found to offer the best overall performance.

The art of selecting and using various oils for lubricants is routinely practiced. However, environmental regulations now restrict the use of volatile organic compounds (VOCs), which affects the lubricating oil selection and/or the method of application. U.S. federal and state regulations governing the composition and emissions content of lubricants conforms and limits choices.

Terpenes are a large and varied class of hydrocarbons with the molecular formula $(C_5H_8)_n$ and are produced by a wide variety of plants and trees, such as conifers and pines. Terpenes are derived biosynthetically from units of isoprene, which has the molecular formula $C_5H_8$. The term "terpene" is sometimes used broadly to also include the terpenoids which are terpenes that have been chemically changed or modified, such as through oxidation. A terpene, as used herein, may be any hydrocarbon, natural or synthetic, formed from isoprene units. Terpenes as well as terpenoids, are the primary ingredients of the essential oils of many types of trees, plants, and flowers, including citrus fruits. Terpenes are the major components of rosin (resin) as well as turpentine produced from gum rosin (resin).

The terpenes are generally classified sequentially by the number of isoprene units they contain as hemiterpenes (one isoprene unit), monoterpenes (two isoprene units), sesquiterpenes (three isoprene units), diterpenes (four isoprene units), sesterterpenes (five isoprene units), triterpenes (six isoprene units), and tetraterpenes (eight isoprene units).

When a terpene is modified chemically, such as by oxidation or rearrangement of the carbon skeleton, the resulting compound is generally referred to as a terpenoid. Terpenes and terpenoids are typically derived from plants, trees, flowers, and other vegetation. They come in the form of liquids, solids, waxes, oils, and alcohols. Terpenes and terpenoids may be formed as acyclic, monocyclic, or polycyclic structures. Sometimes alternatively referred to as "isoprenoids", terpenoids are derived from five-carbon isoprene units and can be classified as "modified terpenes", where methyl groups have been moved or removed, or oxygen atoms added. Some researchers use the term terpene to include all terpenoids.

Terpenes and terpenoids in various forms have been used for centuries in fragrances due to their compatibility with other compounds and their minimal negative environmental impact. Terpineol, a terpene alcohol, has the chemical formula: $C_{10}H_{18}O$ and is found in three isomeric forms, alpha, beta, and gamma, with beta-terpineol being non-naturally occurring. Terpenes and terpenoids have been used for other purposes, such as disinfectants, cleaning compounds, soaps, cosmetics, and colognes. They are also known to add, enhance, or mask the odor of products which might be offensive to humans or animals.

The term "terpene" is derived from the word "turpentine". Turpentine is a volatile fluid which is distilled and refined for further commercial uses. The most common terpenes obtained from rosin (resin) distillation are the bicyclic terpenes alpha-pinene (α-pinene), beta-pinene (β-pinene), delta-3 carene (δ-3 carene), and sabinene, the monocyclic terpenes limonene and terpinolene, and smaller amounts of tricyclic sesquiterpenes longifolene, caryophyllene, and delta-cadinene. Rubber, which is a polyterpene, is one of the most widely known terpenes.

As with other plant essential oils, terpenes are major constituents of the essential oils of citrus fruits. However, they are removed before the essential oil is used for flavoring beverages and foods because they tend to produce undesirable tastes when permitted to oxidize and polymerize.

Terpene hydrocarbons are liquid distillates separated from rosin pitch or sap from conifers, pine trees, citrus, and varied vegetation. The volatile terpene hydrocarbons, Chemical Abstracts Service Number (CAS#) 8006-64-2, are non-oxygenated with the molecular formula $C_{10}H_{16}$. Common names include terpenes, diterpenes, pure gum turpentine (PGT), oil of turpentine (OT), and limonene. Commercial areas of use include in paint thinners, paint strippers, cleaners, disinfectants, and pharmaceuticals.

Pure gum turpentine is a complex formulation made of α-pinene (CAS#80-56-8) 40%-55% weight, β-pinene (CAS#127-91-3) 25%-35% weight, and the balance mixed trace terpenes. Pure gum turpentine is 99.5%-100% volatile, evaporating slightly less (0.9) than the reference standard (butyl acetate (1.0)) and has a flash point of 35° C./95° F., a boiling point of 155-180° C., and a Kauri-butanol (Kb) value greater than 50 and is generally soluble in organic solvents.

U.S. Pat. No. 7,273,839, issued Sep. 25, 2007 to Koetzle and hereby incorporated by reference herein, discloses the use of terpene alcohols with organic solvents and blends of solvents to increase the flash points of these solvents. Koetzle also discloses a method to decrease the flammability of normally flammable solvents using terpene alcohols, by blending the terpene alcohol into the flammable solvent. Koetzle discloses increasing the flash points of acetone, methanol, ethyl acetate, ethanol, and xylene by 50 to 60° C., by addition of 12-14% terpineol. Koetzle also discloses solvents blended with other organic solvents to produce performance solvents, such as paint strippers with flash points greater than 140° F.

Turpentine, which is also known as spirit turpentine, oil of turpentine, and wood turpentine, is obtained by the distillation of resin from trees, usually pine trees. Turpentine prepared in this manner includes mostly alpha-pinene and beta-pinene, two terpene isomers. The exact composition of turpentine may vary from batch to batch depending on the distillation conditions and the resin source. As a solvent, turpentine has been used in varnishes and for thinning oil-based paints.

Terpene alcohols generally have the structure of terpenes except that they include at least one hydroxyl group. A terpene alcohol, as used herein, may be any compound, natural or synthetic, formed from isoprene units and having at least one hydroxyl group. Terpene alcohols are also derived from plants, trees, flowers, and other vegetation which allows their classification as "green compounds". Terpene alcohols are also divided into groups determined by the number of carbon atoms and repeating isoprene units. Terpene alcohols may be formed as acyclic, monocyclic, or polycyclic structures. Terpineol, a terpene alcohol, has the chemical formula: $C_{10}H_{18}O$ and is found in three isomeric forms, alpha (α), beta (β), and gamma (γ), with β-terpineol being non-naturally occurring. Terpene alcohols have been used for many purposes, including, but not limited to, disinfectants, cleaning compounds, soaps, cosmetics, and colognes. They are also known to add to, enhance, or mask the odor of products which might be otherwise offensive to humans or animals.

Latex paints are currently being used almost exclusively today, because they are water based and nonflammable and they do not emit any harmful vapors into the atmosphere. Latex paints, however, do have drawbacks in comparison to oil-based paints, which are currently banned in many places for their flammability and vapor emissions. Oil-based coatings, such as vinyl coatings and oil-based paints, are more durable than latex paints. Lines on streets and roads made with latex paints must be repainted much more frequently than lines made with oil-based paints. Oil-based coatings are also easier to spread, easier to touch up, and can be made more resistant to fungus and molds than latex paints. There is a need in the art for an oil-based coating with reduced flammability, which meets stricter government regulations.

SUMMARY OF THE INVENTION

Compositions and solvent mixtures include at least one organic solvent and at least one terpene. In some embodiments, the terpene is a monoterpene. In some embodiments, the terpene is pure gum turpentine, oil of turpentine, a component of turpentine, or a combination of these. In some embodiments, the organic solvent is acetone or a green solvent. Addition of a minimal amount of terpene to the organic solvent or organic solution raises the flash point of the mixture, preferably to a predetermined value. The predetermined value is preferably in the range of 110 to 120° F. The amount of terpene is preferably in the range about 0.05 to about 5 percent by total weight of the mixture. In some embodiments, the compositions are used as coatings, such as paints or adhesives. In some embodiments, at least one terpene is added to a lubrication formulation.

Solvent mixtures include at least one organic solvent and at least one terpene. In some embodiments, the terpene is pure gum turpentine, oil of turpentine, a component of turpentine, or a combination of these. The solvent mixture has a higher flash point than the organic solvent as a result of the addition of the terpene. In some embodiments, the organic solvent is acetone. In some embodiments, the organic solvent is a green solvent. Premix blends include at least one organic solvent, preferably acetone, and at least one terpene. The premix blend is added to an organic solvent or mixture of organic solvents to raise the flash point of the solvent. In some embodiments, at least one terpene is added to a lubrication formulation.

DETAILED DESCRIPTION OF THE INVENTION

In testing coating compositions including a terpene alcohol, the preferred blending of 14% to 18% alpha terpineol by weight in acetone does not yield a desirable outcome. The excessive loading of alpha terpineol results in paint and adhesive formulation problems as a result of incompatibility with some key resins particularly during film formation and drying or curing. The acetone evaporates, leaving the heavy loading of terpineol behind. The terpineol acts as a diluent and phase-separates, forming a layer under the film, within the film, or on the surface of the film. The result for fast drying or curing lacquers, vinyls, and similar coatings is complete rejection of the coating by the substrate. After two to three days of drying or curing time the stressed films lift and float from the surface, having no adhesion or bond strength. Vinyls heavily loaded with terpineol perform the worst. As soon as the acetone evaporates, typically within 15 minutes, the film becomes stressed and simply delaminates from the surface. In this instance, a heavy loading of terpineol acts like a parting agent, or wax, thus preventing adhesion of the film to the substrate. It is also not possible to apply a second coat of these coating compositions to a substrate after a first coat has been applied and allowed to dry.

A coating, as used herein, may be any fluid composition applied, to be applied, or appliable to the surface of a substrate generally to form a thin layer on the substrate. Coatings, as used herein, include, but are not limited to, vinyl coatings, oil-based paints, lacquers, varnishes, and adhesives. Coatings typically include at least one solvent component and at least one non-solvent component. The solvent components provide the coating with the desired fluidity and spreading properties and desired solubility of the non-solvent components. Some or all of the solvent components may evaporate from the substrate surface after the coating is applied. The non-solvent components remain on the substrate surface after the coating is applied and include, for example, a pigment in the case of an oil-based paint.

A solvent system of the present invention includes at least one terpene. A solvent system of the present invention also preferably includes at least one volatile organic compound (VOC). In some embodiments, the solvent system further includes at least one terpene alcohol. In some embodiments, at least one of the volatile organic compounds is a green solvent. The terpene has been used in place of one or more terpene alcohols, as disclosed in the above-mentioned related applications, to raise the flash point in solvent systems of the present invention. In some embodiments, a lesser amount of the terpene is required to replace the terpene alcohol to raise the flash point of the solvent system to the same temperature. In a coating composition, the terpene raises the flash point of the composition but preferably evaporates as the coating dries or cures rather than phase-separating and pooling on, in, or under the dried coating. A terpene, as used herein, may be any hydrocarbon, natural or synthetic, formed from isoprene units.

The terpene is preferably a monoterpene formed from two isoprene units and having the molecular formula $C_{10}H_{16}$. Monoterpenes include, but are not limited to, D-limonene, L-limonene, dipentene, terpinolene, alpha-ocimene, beta-ocimene, myrcene, alpha-terpinene, beta-terpinene, gamma-terpinene, sabinene, alpha-thujene, beta-thujene, camphene, carene, alpha-pinene, and beta-pinene.

More preferably, the terpene is turpentine or a component of turpentine. Turpentine, as used herein, may be any distilled resin from trees, usually pine trees. Turpentine may include at least camphene, carene, alpha-pinene, and beta-pinene in varying proportions depending on the resin source and distillation process. Gum turpentine, as used herein, is generally obtained by the distillation of sap from living pine trees, and preferably steam-distilled from *Pinus elliottii* trees. Gum turpentine preferably includes over 90% pinene, almost half of which being beta-pinene. Wood turpentine, in contrast, is generally obtained by distillation or solvent extraction from finely chopped wood chips and generally contains 75 to 85% alpha-pinene and little or no beta-pinene.

In some embodiments, the solvent system also includes at least one terpenoid. Terpenoids include, but are not limited to, terpene alcohols, citral, menthol, and camphor. Terpenoids generally have a vapor pressure that is less than 0.05 mm Hg, thus complying with Exempt VOC standards. Terpene alcohols include, but are not limited to, alpha terpineol, beta terpineol, gamma terpineol, geraniol, citronellol, nerol, nerolidol, and farnesol.

In some embodiments, the solvent system consists of about 0.5 to about 5 percent by total weight of the mixture (wt %) of at least one terpene and a single additional volatile organic compound. The additional volatile organic solvent is preferably an exempt VOC but may be a non-exempt VOC within the spirit of the present invention. In some embodiments, the solvent system consists of about 0.5 wt % of at least one terpene and about 0.5 wt % of a terpene alcohol and a single additional volatile organic compound. In some embodiments, the solvent system consists of about 1 wt % of at least one terpene, about 20 wt % of acetone, and a single additional volatile organic compound. In some embodiments, the solvent system consists of about 1 wt % of at least one terpene, about 1 wt % of at least one terpene alcohol, about 20 wt % of acetone, and a single additional volatile organic compound. In some embodiments, the solvent system includes more than one additional volatile organic compound in place of the single additional volatile organic compound in any of the formulations described above. In some embodiments, the terpene is turpentine. In some embodiments, the terpene alcohol is alpha terpineol. In some embodiments, the solvent system is used as the basis for a coating, where non-solvent components of the coating are added to the solvent system to produce the coating composition. In some embodiments, the terpene or the terpene alcohol is added to the solvent components prior to addition of the non-solvent components of the coating. Alternatively, the terpene or the terpene alcohol may be added to the coating composition after the non-solvent components are added.

A solvent system of the present invention preferably includes about 0.5 wt % of at least one terpene, about 20 wt % acetone, and about 79.5 wt % of a volatile organic compound (VOC) to raise the flash point of the system above 40° C. (104° F.). In some embodiments, the terpene is selected from the group consisting of gum turpentine, dipentene, terpinolene, limonene, alpha-pinene, beta-pinene, and any combination of these. In some embodiments, the volatile organic solvent is selected from the group consisting of acetone, methyl acetate, parachlorobenzotrifluoride (PCBTF), tert-butyl acetate (TBAc), dimethyl carbonate (DMC), toluene, xylene, mineral spirits, methanol, isopropanol, ethyl acetate, methyl ethyl ketone (MEK), and isobutyl isobutyrate (IBIB). The terpene may also improve the performance, economic gain, or the solvent efficiency of the solvent system. In some embodiments, the terpene is present in a concentration less than 0.5 wt % and may be as low as about 0.25 wt % in some embodiments. These solvent systems may be used as cleaners, paint strippers, finish strippers, degreasers, to remove oils or lipids from a solid surface, or in any other application needing solvents with the characteristics of the solvent systems described herein.

Although any organic solvent system including at least one terpene may be used within the spirit of the present invention, in some embodiments the solvent system is a coating system. Coating systems for use with the present invention include, but are not limited to, oil-based paints, varnishes, lacquers, adhesives, and vinyl coatings. The oil-based paint may be for artistic use or for painting structures, including, but not limited to, buildings, walls, furniture, road surfaces, and signs. The solvent system may be any organic solvent system known in the art to which at least one terpene has been added to raise the flash point. Preferably, the terpene raises the flash point of the system to above 100° F. More preferably, the terpene raises the flash point of the system to above 110° F. to meet most international standards for non-flammables. More preferably, a minimum amount of terpene is used to raise the flash point to about 110 to 120° F. The amount of terpene is preferably in the range of about 0.05 to about 5 wt %.

An oil-based paint as used herein preferably includes at least one pigment, at least one binder, at least one solvent, and at least one additive. The non-terpene solvent or solvents in the oil-based paint may include, but are not limited to, aliphatics, aromatics, alcohols, ketones, white spirit, petroleum distillate, esters, and glycol esters. In embodiments of the present invention, at least one terpene is additionally included in the oil-based paint.

In a method of the present invention, the flash point of a solvent system without a terpene is measured. The solvent system is preferably a coating system. Flash points are then measured for the solvent system with varying amounts of at least one terpene added. Preferably, the terpene raises the flash point of the system to above 100° F. More preferably, the terpene raises the flash point of the system to above 110° F. The improved solvent system preferably has an amount of at least one terpene to raise the flash point to the range of 110 to 120° F. In some embodiments, the terpene raises the flash point of the system to above 140° F. The improved solvent system more preferably has a minimal amount of at least one terpene to raise the flash point to the range of 110 to 120° F.

Experiments were run to determine the flash point for solvent compositions including at least one terpene. The turpentine used to achieve the results described below was Klean-Strip® Green™ Turpentine, advertised as pure turpentine from tree resin, manufactured by W.M. Barr & Co., Inc. (Memphis, Tenn.). The material safety data sheet (MSDS) for this product lists the hazardous component as turpentine (gumspirits; supfate wood turpentine). The flash points of the pure components used in these experiments are listed in Table 1.

TABLE 1

Flash Points of Pure Solvents

| Solvent | Flash Point (° C.) | Flash Point (° F.) |
| --- | --- | --- |
| Klean-Strip ® Green ™ Turpentine | 36 | 97 |
| D-limonene | 50 | 122 |
| acetone | −20 | −4 |
| parachlorobenzotrifluoride | 43 | 109 |
| tert-butyl acetate | 40 | 104 |
| dimethyl carbonate | 17 | 63 |
| ethyl lactate | 46 | 115 |
| xylene | 30 | 86 |
| methyl ethyl ketone | −9 | 16 |
| methanol | 12 | 54 |
| isopropanol | 12 | 53 |
| methyl acetate | −9 | 15 |

For each of the tests, the given mixtures were prepared. Each mixture was then tested in accordance with ASTM D3828, "Standard Test Methods for Flash Point by Small Scale Closed Tester", which is hereby incorporated by reference herein. Briefly, each mixture was heated to a given temperature and then exposed to a flame. The experiment was repeated multiple times for each mixture at increasing temperatures until flashing of the vapor was observed upon exposure to a flame to determine an approximate range for the flash point. The non-limiting examples below are intended only to be illustrative of the principles of the present invention.

A mixture of 0.5 wt % turpentine and 99.5 wt % acetone was measured to have a flash point in the range of 115 to 125° F.

A mixture of 1 wt % turpentine and 99 wt % acetone was measured to have a flash point in the range of 115 to 125° F.

A mixture of 3 wt % turpentine and 97 wt % acetone was measured to have a flash point in the range of 120 to 130° F.

A mixture of 0.5 wt % D-limonene and 99.5 wt % acetone was measured to have a flash point in the range of 115 to 125° F.

A mixture of 1 wt % D-limonene and 99 wt % acetone was measured to have a flash point in the range of 115 to 125° F.

A mixture of 3 wt % D-limonene and 97 wt % acetone was measured to have a flash point in the range of 115 to 125° F.

A mixture of 20 wt % acetone, 3 wt % turpentine, and 77 wt % parachlorobenzotrifluoride (PCBTF) was measured to have a flash point in the range of 175 to 185° F.

A mixture of 20 wt % acetone, 3 wt % turpentine, and 77 wt % tert-butyl acetate was measured to have a flash point in the range of 165 to 175° F.

A mixture of 20 wt % acetone, 3 wt % turpentine, and 77 wt % dimethyl carbonate was measured to have a flash point in the range of 165 to 175° F.

A mixture of 20 wt % acetone, 3 wt % turpentine, and 77 wt % ethyl lactate was measured to have a flash point above 200° F.

A mixture of 20 wt % acetone, 3 wt % turpentine, and 77 wt % xylene was measured to have a flash point in the range of 160 to 170° F.

A mixture of 20 wt % acetone, 3 wt % turpentine, and 77 wt % methyl ethyl ketone was measured to have a flash point in the range of 140 to 150° F.

A mixture of 20 wt % acetone, 3 wt % turpentine, and 77 wt % methanol was measured to have a flash point in the range of 160 to 170° F.

A mixture of 20 wt % acetone, 3 wt % turpentine, and 77 wt % isopropanol was measured to have a flash point in the range of 160 to 170° F.

A mixture of 20 wt % acetone, 1 wt % turpentine, and 79 wt % methyl acetate was measured to have a flash point in the range of 120 to 130° F.

A mixture of 20 wt % acetone, 1 wt % turpentine, and 79 wt % dimethyl carbonate was measured to have a flash point in the range of 160 to 170° F.

Methods of raising the flash point of a solvent system focus upon the use of pure gum turpentine and to a lesser extent other terpenes, as defined herein and represented by varied tests involving substitution in selected procedures to confirm their individual capabilities or efficiencies. Of the terpenes tested, pure gum turpentine was selected as offering the best and broadest measure of performance using the least weight addition in each formulation or blend.

In some embodiments, a solvent solution includes pure gum turpentine (PGT) in the range of 0.005 to 1 percent by total weight of the mixture (wt %) added to acetone. The solution is complete, clear and stable, and benefits from a slight pine scent. Pure acetone has a distinct odor, with a flash point of about −20° C./−4° F., and pure gum turpentine has a flash point of about 35° C./95° F. Flash point, as used herein, refers to the lowest temperature at which a volatile liquid can vaporize to form an ignitable mixture in air. The combined mixture has a flash point of greater than 47° C./118° F. when tested in accordance with ASTM D-3828 as confirmed by a three-test average. The use of 0.5 to 1 wt % pure gum turpentine in acetone is significant because the VOC weighting (contribution) is less than 4 g/L, making the mixture quite useable to reduce emissions and comply with current environmental regulations for total weight discharged. The evaporation rate for acetone and the weight residual based upon an evaporation test was below the measurement capability and significantly lower that the evaporation rate of pure acetone. A color or stain residual on a clean white panel after evaporation was not perceptible, thus confirming complete evaporation.

A test objective was to determine the effectiveness and efficiency of a mixture of a VOC and pure gum turpentine. VOCs were selected from the Federal Register 40 CFR 51.100(s) list of Exempt VOCs, applicable to the Federal EPA Emissions Regulations for Industrial Atmospheric Discharge, which includes acetone, methyl acetate, tertiary butyl acetate, p-chlorobenzotrifluoride, and dimethyl carbonate.

PGT Test #1: Laboratory solutions were prepared for PGT in acetone at 0.25 wt %, 0.5 wt %, 1 wt %, 2 wt %, 3 wt %, 5 wt %, and 10 wt % in acetone. The subsequently-measured flash points showed a steady increase from about 47° C./118° F. for 0.25 wt % up to a peak reading of about 52° C./125° F. for the 3 wt % loading of PGT. All flash points were conducted in accordance with ASTM D-3828 standard test methods for flash point by small scale closed tester. All test results were the average of three tests.

PGT Test #2: Methyl acetate, with a low flash point of about −10.5° C./15° F., was selected from the list of exempt VOCs. PGT was thoroughly mixed at 2 wt % with methyl acetate, forming a clear solution. The mixture was permitted to stabilize for 12 hours and was tested in accordance with ASTM D-3828. The flash point of the mixture was determined to be about 55.6° C./132° F., the average of three tests. The VOC contribution of the PGT was 2 wt % or about 18.4 g/L.

PGT Test #3: Methyl acetate was evaluated by treatment with a blend of PGT and acetone. PGT was mixed well with acetone at a weight ratio of 3:20 to form the blend. The blend was then added to methyl acetate at a weight ratio of 23:77, and the resulting solvent mixture was mixed well. The mixture was permitted to stabilize for 12 hours and was tested in accordance with ASTM D-3828. The flash point of the mixture was determined to be about 76.7° C./170° F., the average of three tests. The VOC contribution of the PGT was 3 wt % or about 27.6 g/L.

PGT Test #4: Tertiary butyl acetate was evaluated by treatment with a blend of PGT and acetone. PGT was mixed well with acetone at a weight ratio of 3:20 to form the blend. The blend was then added to tertiary butyl acetate at a weight ratio of 23:77, and the resulting solvent mixture was mixed well. The mixture was permitted to stabilize for 12 hours and was tested in accordance with ASTM D-3828. The flash point of the mixture was determined to be about 76.7° C./170° F., the average of three tests. The VOC contribution of the PGT was 3 wt % or about 26.5 g/L.

PGT Test #5: P-Chlorobenzotrifluoride was evaluated by treatment with a blend of PGT and acetone. PGT was mixed well with acetone at a weight ratio of 3:20 to form the blend. The blend was then added to p-chlorobenzotrifluoride at a weight ratio of 23:77, and the resulting solvent mixture was mixed well. The mixture was permitted to stabilize for 12 hours and was tested in accordance with ASTM D-3828. The flash point of the mixture was determined to be about 74.4° C./166° F., the average of three tests. The VOC contribution of the PGT was 3 wt % or about 40.7 g/L.

PGT Test #6: Dimethyl carbonate was evaluated by treatment with a blend of PGT and acetone. PGT was mixed well with acetone at a weight ratio of 3:20 to form the blend. The blend was then added to dimethyl carbonate at a weight ratio of 23:77, and the resulting solvent mixture was mixed well. The mixture was permitted to stabilize for 12 hours and was tested in accordance with ASTM D-3828. The flash point of the mixture was determined to be about 76.7° C./170° F., the average of three tests. The VOC contribution of the PGT was 3 wt % or about 27.9 g/L.

Additionally, a series of tests were conducted blending terpineols with terpenes at low weight concentrations to determine effectiveness for raising the flash point of a volatile organic solvent. Initial weight loadings were restricted to 5 wt % or less of the terpene/terpineol mixture with at least 95 wt % of acetone. The terpene used was IFF-5100 (International Flavors & Fragrances, Inc., New York, N.Y.), a commercial dipentene and the evaporation rate of the mixture was reduced by 50% compared to a blend of 5% α-terpineol and acetone. A range of ratios were prepared to determine the optimum ratios for evaporation improvement; however, a 50-50 mixture of terpene and terpene alcohol was determined to be the best overall at raising the flash point. The resulting improvement offers potential uses in sealers, coatings, paints, finishes, lacquers, adhesives, and formulations used for cleaning, stripping, degreasing, and lubricating.

Based upon the just-mentioned success of mixed α-terpineol and terpene to raise the flash point, a variety of commercial terpenes were tested to determine their respective influence on the flash point of acetone. Commercially available terpenes, more specifically pure gum turpentine (PGT), terpene, dipentene, and limonene were selected and acquired for testing. Each terpene was tested separately and blended with acetone at 5 wt %. Acetone was chosen as the most effective medium for testing, as it is an exempt VOC, has a low flash point of −20° C./−4° F., and is classified as "hazardous and flammable". When tested in accordance with ASTM D-3828 the mixture of 95 wt % acetone and 5 wt % terpene was measured to have a flash point reading of 49° C./120° F. Based upon the success of preliminary testing, a test procedure was established for increasing weight loadings to determine an optimum efficiency. A maximum flash point of 52° C./125° F., as an average of three tests, was achieved for a solvent mixture of 3 wt % of PGT mixed with 97 wt % acetone.

The five major exempt VOCs, acetone, methyl acetate, tertiary butyl acetate, dimethyl carbonate, and p-chlorobenzotrifluoride, were selected for the purpose of testing in solvent mixtures with PGT to determine the effect of PGT on the flash point of each respective VOC. Of major concern was the amount of PGT used in the test mixtures because PGT is itself classified as a VOC and regulated for environmental emissions. When PGT was mixed at 0.5 wt % with acetone, the mixture achieved a flash point reading of 47° C./118° F., a substantial increase in the flash point relative to pure acetone. Testing was continued maintaining the PGT loading at 3 wt % for the selected Exempt VOCs. Calculating the acetone blend at 3 wt % of pure gum turpentine, the respective VOC loading for reporting purposes would be 23.97 g/L. A minor benefit in lieu of the safety gain is the fact that PGT is a renewable compound and classified as a "green" substance.

The resulting trials and following test data provide evidence for the ability of "raising the flash points" of Exempt VOCs and making them safer, less hazardous, and therefore more useable for the purposes for which they were intended by the mixing with one or more terpenes. The elevated flash points affect manufacturing costs, insurance, storage, containerization, packaging, and shipping of products. By mixing with selected exempt VOCs, formulators and compounders are given a choice of VOCs to use which comply with U.S. federal and state emission regulations, on a "greener" and more safe basis.

Terpene Test #1: Dipentene 5100 was mixed at 0.5 wt % with acetone, making a clear stable solution. Dipentene 5100 has a slight pine odor and a flash point of about 46° C./115° F., and pure acetone has a flash point of about −20° C./−4° F. The mixture was mixed well, was permitted to stabilize for 12 hours, and was tested in accordance with ASTM D-3828. The flash point was determined to be about 49° C./120° F., the average of three tests.

Terpene Test #2: Dipentene 5100 was mixed at 3 wt % with acetone, making a clear stable solution. The mixture was permitted to stabilize for 12 hours and was tested in accordance with ASTM D-3828. The flash point was determined to be about 52° C./125° F., the average of three tests.

Terpene Test #3: Unitene-D (International Flavors & Fragrances, Inc., New York, N.Y.), a dipentene (CAS#68956-56-9), was mixed at 3 wt % with acetone, making a clear stable solution. The mixture was permitted to stabilize for 12 hours and was tested in accordance with ASTM D-3828. The flash point was determined to be about 52° C./126° F., the average of three tests.

Terpene Test #4: Pure gum turpentine (W.M. Barr & Co., Inc., Memphis, Tenn.) was thoroughly mixed at 0.5 wt % with acetone. PGT has a flash point of about 32° C./95° F. The mixture was permitted to stabilize for 12 hours and was tested in accordance with ASTM D-3828. The flash point was determined to be about 49° C./120° F., the average of three tests.

Terpene Test #5: Pure gum turpentine was thoroughly mixed at 1 wt % with acetone. The mixture was permitted to stabilize for 12 hours and was tested in accordance with ASTM D-3828. The flash point was determined to be about 50° C./122° F., the average of three tests.

Terpene Test #6: Limonene (Florida Chemical Co., Inc., Winter Haven, Fla.) was thoroughly mixed at 0.5 wt % with acetone. Limonene has a flash point of about 48° C./119° F. The mixture was permitted to stabilize for 12 hours and was tested in accordance with ASTM D-3828. The flash point was determined to be about 46.7° C./116° F., the average of three tests.

Terpene Test #7: Limonene was thoroughly mixed at 1 wt % with acetone. The mixture was permitted to stabilize for 12 hours and was tested in accordance with ASTM D-3828. The flash point was determined to be about 51° C./124° F., the average of three tests.

Terpene Test #8: Pure gum turpentine was thoroughly mixed at 3 wt % with acetone. The mixture was permitted to stabilize for 12 hours and was tested in accordance with ASTM D-3828. The flash point was determined to be about 53.3° C./128° F., the average of three tests. This mixture had the highest flash point of those tested in this series.

Terpene Test #9: Limonene was thoroughly mixed at 3 wt % with acetone. The mixture was permitted to stabilize for 12 hours and was tested in accordance with ASTM D-3828. The flash point was determined to be about 48° C./118° F., the average of three tests.

The terpene test results using acetone confirm that terpenes in general, when mixed with acetone at less than 5 wt %, raise the flash point of the solvent mixture to at least about 46.7° C./116° F., and become optimum at about a 3 wt % loading. Of the terpenes tested, pure gum turpentine had the greatest effect and best efficiency performance based upon these tests, raising the flash point of acetone by addition of just 0.5 wt % to about 49° C./120° F.

The above-discussed testing centered on solvent mixtures of terpenes and acetone. The efficiency of PGT suggested the basis of a "blend", where a fixed amount of PGT would be mixed with acetone to make a premix blend. The premix blend would then be added to a specific VOC, thus completing the solution. The premix blend would become a standard premix added to a VOC or blend of VOCs. This series of tests is based upon a "premix blend" using standard VOCs which are emission regulated. Many of these VOCs are necessary for formulators and compounders as there is simply no current substitute. Selection of VOCs for testing was based upon generic classes to provide a good cross-section. For these experiments, the premix blend was PGT and acetone in a weight ratio of 3:20. This pre-mix blend was then mixed with the VOC in a weight ratio of 23:77.

Blend Test #1: Ethyl lactate is a "green" VOC derived from corn with a flash point of about 47.8° C./118° F. PGT was mixed well with acetone at a weight ratio of 3:20 to form the blend. The blend was then added to ethyl lactate at a weight ratio of 23:77, and the resulting solvent mixture was mixed well. The mixture was permitted to stabilize for 12 hours and was tested in accordance with ASTM D-3828. The flash point of the mixture was determined to be about 87.8° C./190° F., the average of three tests. The mixture was stable and had a reportable 80 wt % VOC content due to the exempt acetone being 20 wt %.

Blend Test #2: Xylene is an aromatic VOC and a petroleum distillate with a flash point of about 26.7° C./80° F. PGT was mixed well with acetone at a weight ratio of 3:20 to form the blend. The blend was then added to xylene at a weight ratio of 23:77, and the resulting solvent mixture was mixed well. The mixture was permitted to stabilize for 12 hours and was tested in accordance with ASTM D-3828. The flash point of the mixture was determined to be about 74.4° C./166° F., the average of three tests. The mixture was stable and had a reportable 80 wt % VOC content due to the exempt acetone being 20 wt %.

Blend Test #3: Methyl ethyl ketone is a VOC and a petroleum distillate with a flash point of about −3° C./26° F. PGT was mixed well with acetone at a weight ratio of 3:20 to form the blend. The blend was then added to methyl ethyl ketone at a weight ratio of 23:77, and the resulting solvent mixture was mixed well. The mixture was permitted to stabilize for 12 hours and was tested in accordance with ASTM D-3828. The flash point of the mixture was determined to be about 65.6° C./150° F., the average of three tests. The mixture was stable and had a reportable 80 wt % VOC content due to the exempt acetone being 20 wt %.

Blend Test #4: Methanol is a VOC and a wood or fossil fuel distillate with a flash point of about 12.2° C./54° F. PGT was mixed well with acetone at a weight ratio of 3:20 to form the blend. The blend was then added to methanol at a weight ratio of 23:77, and the resulting solvent mixture was mixed well. The mixture was permitted to stabilize for 12 hours and was tested in accordance with ASTM D-3828. The flash point of the mixture was determined to be about 71° C./160° F., the average of three tests. The mixture was stable and had a reportable 80 wt % VOC content due to the exempt acetone being 20 wt %.

Blend Test #5: Isopropyl alcohol is a VOC produced from propylene distillation with a flash point of about 11.5° C./53° F. PGT was mixed well with acetone at a weight ratio of 3:20 to form the blend. The blend was then added to isopropyl alcohol at a weight ratio of 23:77, and the resulting solvent mixture was mixed well. The mixture was permitted to stabilize for 12 hours and was tested in accordance with ASTM D-3828. The flash point of the mixture was determined to be about 76.7° C./170° F., the average of three tests. The mixture was stable and had a reportable 80 wt % VOC content due to the exempt acetone being 20 wt %.

The results of this series of tests confirm the efficiency and efficacy of a fixed premix blend, based upon PGT and acetone, which may be added to other VOCs at a pre-determined ratio. The premix blend may be used with many generic classes of both exempt and non-exempt VOCs. This provides excellent economy of scale with overall VOC emission reduction. The acetone in the premix blend facilitates water reduction and/or water cleanup.

The testing of pure gum turpentine has illustrated the efficiency and effectiveness upon the flash point of acetone. Acetone, being an Exempt VOC and powerful solvent, was thought to provide the basis of a premix blend, which would be added to other VOCs for the purpose of raising the mixture's flash point with minimum impact upon the VOC content of the mixture. A selection of solvents for testing was made from the Exempt VOC listing in Federal Register 40 CFR-51.100(s) resulting in acetone, methyl acetate, tertiary butyl acetate, p-chlorobenzotrifluoride, and dimethyl carbonate.

Blend Test #6: PGT was mixed well with acetone at a weight ratio of 3:20 to form the blend. The blend was then added to methyl acetate at a weight ratio of 23:77, and the resulting solvent mixture was mixed well. The mixture was permitted to stabilize for 12 hours and was tested in accordance with ASTM D-3828. The flash point of the mixture was determined to be about 53.3° C./128° F., the average of three tests. The mixture had a reportable 3 wt % VOC content, the balance being exempt VOCs.

Blend Test #7: PGT was mixed well with acetone at a weight ratio of 3:20 to form the blend. The blend was then added to tertiary butyl acetate at a weight ratio of 23:77, and the resulting solvent mixture was mixed well. The mixture was permitted to stabilize for 12 hours and was tested in accordance with ASTM D-3828. The flash point of the mixture was determined to be about 76.7° C./170° F., the average of three tests. The mixture had a reportable 3 wt % VOC content, the balance being exempt VOCs.

Blend Test #8: PGT was mixed well with acetone at a weight ratio of 3:20 to form the blend. The blend was then added to p-chlorobenzotrifluoride at a weight ratio of 23:77, and the resulting solvent mixture was mixed well. The mixture was permitted to stabilize for 12 hours and was tested in accordance with ASTM D-3828. The flash point of the mixture was determined to be about 80° C./176° F., the average of three tests. The mixture had a reportable 3 wt % VOC content, the balance being exempt VOCs.

Blend Test #9: PGT was mixed well with acetone at a weight ratio of 3:20 to form the blend. The blend was then added to dimethyl carbonate at a weight ratio of 23:77, and the resulting solvent mixture was mixed well. The mixture was permitted to stabilize for 12 hours and was tested in accordance with ASTM D-3828. The flash point of the mixture was determined to be about 76.7° C./170° F., the average of three tests. The mixture had a reportable 3 wt % VOC content, the balance being exempt VOCs.

Blend Test #10: PGT was mixed well with acetone at a weight ratio of 3:20 to form the blend. The blend was then added to acetone at a weight ratio of 23:77, and the resulting solvent mixture was mixed well. The mixture was permitted to stabilize for 12 hours and was tested in accordance with ASTM D-3828. The flash point of the mixture was determined to be about 53.3° C./128° F., the average of three tests. The mixture had a reportable 3 wt % VOC content, the balance being exempt VOCs.

This series of tests illustrates the effectiveness of a premix blend based upon pure gum turpentine and acetone. When properly weighed and blended, the mixture raises the flash point of a mixture with a VOC substantially above that of the individual component flash points. The premix blend avoids increasing the VOC loading beyond that of the pure gum turpentine. When used with "green" solvents the pure gum turpentine adds to the "green" classification with a nominal VOC contribution.

Additionally, the use of pure gum turpentine (PGT) modified volatile fluids offers a safe alternative to a lubricant compounder and affords a choice of VOCs for compliance with air emission regulations. After a series of laboratory and field tests, it was discovered that the use of exempt VOC fluids, namely acetone, methyl acetate, tertiary butyl acetate, p-chlorobenzotrifluoride, and dimethyl carbonate, blended with about 0.5 wt % to about 50 wt % of PGT raises their respective flash points to a desired, predetermined level while reducing the viscosity of petroleum oils, vegetable oils, and synthetic oils. The reduced viscosity of the lubricating oils or oil blends permitted the wetting of surfaces and penetration into cracks, joints, and steel pores while permitting the lubricants to be packaged and applied in a more conventional manner.

Terpineols, which are a type of terpene alcohol, have been previously mixed and tested with various VOCs and exempt VOCs in order to raise the respective flash points to a more safe level for use. Solvent mixtures with terpenes or terpenes mixed with terpineols were tested for the ability to speed the evaporation rate of mixed terpene alcohols.

The above-described embodiments demonstrate the ability of one or more terpenes to be able to raise the flash point of a volatile organic solvent, when mixed with the volatile organic solvent in a total terpene amount in the range of about 0.25 to about 5 wt % of the mixture, to at least in the range of about 117 to about 129° F. depending on the volatile organic solvent. The above-described embodiments also demonstrate the ability of one or more terpenes in combination with acetone to be able to raise the flash point of a volatile organic solvent, when mixed with the volatile organic solvent in a total terpene amount in the range of about 1 to about 3 wt % of the mixture and acetone in an amount of about 20 wt % of the mixture, to at least in the range of 57 to 134° F. depending on the volatile organic solvent.

In some embodiments, the total amount of terpenes added to the solvent system is selected to raise the flash point of the solvent system to a predetermined value. In some embodiments, the predetermined value is in the range of about 110 to about 120° F. In some embodiments, the total amount of terpenes added to the solvent system is selected to raise the flash point of the solvent system above a predetermined value. In some embodiments, the predetermined value is about 110° F.

In some embodiments, the amount of acetone and the total amount of terpenes added to the solvent system are selected to raise the flash point of the solvent system to a predetermined value. In some embodiments, the predetermined value is in the range of about 110 to about 120° F. In some embodiments, the amount of acetone and the total amount of terpenes added to the solvent system are selected to raise the flash point of the solvent system above a predetermined value. In some embodiments, the predetermined value is about 110° F.

A series of lubricating formulations was established based upon the use of petroleum and vegetable oil lubricants to serve a variety of penetrating lubricant uses. One objective was to provide for a choice of environmentally acceptable penetrating lubricants which complied with current air emission regulations and offered "green" lubricant options concurrent with petroleum-based lubricants. Consideration was given to conventional and industrial application methods including, but not limited to, aerosol spraying, manual pump spraying, brush-pad application, and hypodermic precision oiling. Development consideration emphasized flash point safety, lubrication, low penetrating viscosity, airborne emission compliance, use of renewable resources, and biodegradability.

Solvent Mixture #1, a petroleum-based penetrating lubricant with a flash point of 51.5° C./125° F. was formed as a solvent mixture of the following ingredients:

| Ingredient | Amount | VOC Content |
|---|---|---|
| Automatic Transmission Fluid | 60 wt % | Non-volatile, not rated |
| Acetone, Exempt Fluid | 36 wt % | Exempt VOC |
| Pure Gum Turpentine | 4 wt % | Reportable VOC |

Solvent Mixture #2, a petroleum-based rust-inhibiting lubricant with a flash point of 50° C./122° F. was formed as a solvent mixture of the following ingredients:

| Ingredient | Amount | VOC Content |
|---|---|---|
| Automatic Transmission Fluid | 50 wt % | Non-volatile, not rated |
| Anhydrous Lanolin | 10 wt % | Non-volatile |
| Acetone, Exempt Fluid | 36 wt % | Exempt VOC |
| Pure Gum Turpentine | 4 wt % | Reportable VOC |

Solvent Mixture #3, a green penetrating lubricant with a flash point of 49° C./120° F. was formed as a solvent mixture of the following ingredients:

| Ingredient | Amount | VOC Content |
|---|---|---|
| Methyl Ester Blend | 55 wt % | 1.7 g/L VOC |
| Acetone, Exempt Fluid | 42 wt % | Exempt VOC |
| Pure Gum Turpentine | 3 wt % | Reportable VOC |

Solvent Mixture #4, a green rust-inhibiting penetrating lubricant with a flash point of 50° C./122° F. was formed as a solvent mixture of the following ingredients:

| Ingredient | Amount | VOC Content |
|---|---|---|
| Methyl Ester Blend | 25 wt % | 1.7 g/L VOC |
| Soy Methyl Ester | 25 wt % | 3 g/L VOC |
| Anhydrous Lanolin | 10 wt % | Non-Volatile |
| Acetone, Exempt Fluid | 37 wt % | Exempt VOC |
| Pure Gum Turpentine | 3 wt % | Reportable VOC |

Solvent Mixture #5, a green penetrating lubricant with a flash point of 51° C./124° F. was formed as a solvent mixture of the following ingredients:

| Ingredient | Amount | VOC Content |
|---|---|---|
| Methyl Ester Blend, recycled | 50 wt % | 1.7 g/L VOC |
| Acetone, Exempt Fluid | 25 wt % | Exempt VOC |
| Pure Gum Turpentine | 3 wt % | Reportable VOC |
| Tertiary Butyl Acetate, Fluid | 22 wt % | Exempt VOC |

Solvent Mixture #6, a green penetrating lubricant with a flash point of 51.5° C./125° F. was formed as a solvent mixture of the following ingredients:

| Ingredient | Amount | VOC Content |
|---|---|---|
| Methyl Ester Blend, recycled | 50 wt % | 1.7 g/L VOC |
| Acetone, Exempt Fluid | 25 wt % | Exempt VOC |
| Pure Gum Turpentine | 3 wt % | Reportable VOC |
| Dimethyl Carbonate | 22 wt % | Exempt VOC |

In some embodiments, pure gum turpentine is blended with acetone in an amount in the range of about 0.005 wt % to about 10 wt % to form a stable solvent mixture while raising the flash point of the acetone from about −20° C./−4° F. to at least about 43.3° C./110° F., as measured in accordance with ASTM D-3828 test procedure. In some embodiments, the pure gum turpentine is identified by CAS#9005-90-7.

In some embodiments, pure gum turpentine is blended with acetone in an amount of about 3 wt % to form a stable solvent mixture improved by the addition of a pine odor and a flash point raised from about −20° C./−4° F. up to about 52° C./125° F., as measured in accordance with ASTM D-3828.

In some embodiments, the pure gum turpentine is partially or fully replaced by weight by oil of turpentine (OT) in solvent mixtures to perform identically or similarly to the pure gum turpentine alone. In some embodiments, the oil of turpentine is identified by CAS#8006-64-2.

In some embodiments, the pure gum turpentine and/or oil of turpentine is mixed in approximately equal weight portions with one or more terpene alcohols to form a stable compound exhibiting a reduction in the evaporation rate of mixture in comparison to the evaporation rate of the unmixed terpene alcohols. In some embodiments, the reduction in the evaporation rate is 50%.

In some embodiments, the pure gum turpentine and oil of turpentine are mixed in approximately equal weight portions to form a stable mixture and added at about 3 wt % to acetone to raise the flash point of the acetone from about −20° C./−4° F. to about 48.9° C./120° F., as measured in accordance with ASTM D-3828 test procedure.

In some embodiments, the pure gum turpentine and/or oil of turpentine, when added to a VOC in an amount of about 10 wt % or less, raises the flash point of the VOC mixture from below about 37.8° C./100° F., to greater than about 43.3° C./110° F.

In some embodiments, the pure gum turpentine and/or oil of turpentine, being hydrocarbon solvents without oxygen or hydroxyl activity, are permitted for use in VOCs classified as "polyurethane grade", free from hydroxyls or water. Being hydroxyl free permits their use with other free solvents or VOCs commonly used in polyurethanes, chlorinated rubber, vinyls, or polyvinyl acetate co-polymers.

In some embodiments, the pure gum turpentine and/or oil of turpentine, being "green" compounds obtained from vegetation, preferably mainly pine trees or conifers, may be classified as such and may be blended with other "green" VOCs, oils, and esters to maintain a green" classification for marketing purposes.

In some embodiments, the premix blend is based upon a mixture of about 0.5 wt % to about 5 wt % of pure gum turpentine and/or oil of turpentine and about 15 wt % to about 30 wt % acetone to be mixed with a VOC, the VOC forming about 65 wt % to about 85 wt % of the final solvent mixture, to raise the flash point of the VOC mixture from below about 35° C./95° F. to above about 37.8° C./100° F., thereby converting the "hazardous, flammable" classification to "combustible" and affording a wider range of safety in uses.

In some embodiments, the premix blend is based upon a mixture of pure gum turpentine, oil of turpentine, and a terpene alcohol in any proportions, the mixture not to exceed about 5 wt % and added to acetone at about 25 wt %, thus forming the premix blend, which may be then added to a VOC or blend of VOCs to raise the flash point of the mixture from below about 35° C./95° F., to above about 37.8° C./100° F., thereby converting the "hazardous, flammable" classification to "combustible" and affording a wider range of safety in uses. In some embodiments, the VOC forms about 70 wt % of the final solvent mixture.

In some embodiments, the premix blend is based upon pure gum turpentine at 10.5 wt % mixed with acetone at 89.5 wt %. In some embodiments, the premix blend is stored, containerized, sealed, and used at a later date to blend or mix with a VOC or VOC mixture, for the purpose of raising the flash point of the VOC or VOC mixture.

In some embodiments, the premix blend is based upon pure gum turpentine and/or oil of turpentine and is classified as a 90% Exempt VOC by the blend including acetone at about 90 wt %, thus when used with exempt VOCs or VOC mixtures it decreases rather than adds to VOC emission discharge.

In some embodiments, the pure gum turpentine and/or oil of turpentine constitutes a "green" blend addition for used with VOCs or exempt VOCs for the purpose of raising the flash points of "green" VOCs and "green" exempt VOCs, without jeopardizing the "green" classification while concurrently reducing the overall VOC emissions of the mixture.

Although the invention has been described primarily with pure gum turpentine being the terpene component included in a solvent system, any terpene or mixture of terpenes may be used in combination with or in place of the particular terpene component or components described in any of the solvent mixtures described herein within the spirit of the present invention. Terpenes for use in solvent systems include, but are not limited to, D-limonene, L-limonene, dipentene, terpinolene, alpha-ocimene, beta-ocimene, myrcene, alpha-terpinene, beta-terpinene, gamma-terpinene, sabinene, alpha-thujene, beta-thujene, camphene, carene, alpha-pinene, and beta-pinene.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A solvent mixture comprising:
    a volatile organic solvent system comprising at least one volatile organic compound; and
    a solvent formulation comprising at least one terpene component selected from the group consisting of:
        pure gum turpentine;
        oil of turpentine; and
        any combination of the above;
    wherein the solvent mixture has a mixture flash point higher than a compound flash point of the volatile organic compound.

2. The solvent mixture of claim 1, wherein the amount of the terpene component is about 0.005 wt % to about 5 wt % of the solvent mixture.

3. The solvent mixture of claim 1, wherein the solvent formulation further comprises acetone.

4. The solvent mixture of claim 1, wherein the amount of the solvent formulation is about 0.5 wt % to about 30 wt % of the solvent mixture.

5. The solvent mixture of claim 1, wherein the solvent formulation further comprises at least one terpenoid component.

6. The solvent mixture of claim 1, wherein the flash point of the solvent mixture is at least 30° F. higher than the flash point of the volatile organic solvent system.

7. The solvent mixture of claim 1, wherein the volatile organic compound is selected from the group consisting of: acetone, parachlorobenzotrifluoride, tert-butyl acetate, dimethyl carbonate, ethyl lactate, xylene, methyl ethyl ketone, methanol, isopropanol, methyl acetate, methyl ester blend, soy methyl ester, and any combination of the above.

8. A solvent mixture comprising:
    a volatile organic solvent system comprising at least one volatile organic compound; and
    a solvent formulation comprising at least one terpene component selected from the group consisting of terpinolene, alpha-ocimene, beta-ocimene, alpha-terpinene, beta-terpinene, gamma-terpinene, sabinene, alpha-thujene, beta-thujene, camphene, carene, and any combination of the above;
wherein the solvent mixture has a mixture flash point higher than a compound flash point of the volatile organic compound.

9. The solvent mixture of claim 8, wherein the solvent formulation further comprises acetone, wherein the amount of the terpene component is about 0.1 wt % to about 50 wt % and the amount of acetone is about 50 wt % to about 99.9 wt % of the solvent formulation.

10. The solvent mixture of claim 8 further comprising at least one terpenoid component.

11. The solvent mixture of claim 8, wherein addition of the solvent formulation to the volatile organic solvent system raises the flash point of the volatile organic solvent system by at least 30° F.

12. A method of raising the flash point of a volatile organic solvent system comprising at least one volatile organic compound, the method comprising:
determining an amount of a solvent formulation comprising at least one terpene selected from the group consisting of terpinolene, alpha-ocimene, beta-ocimene, alpha-terpinene, beta-terpinene, gamma-terpinene, sabinene, alpha-thujene, beta-thujene, camphene, carene, pure gum turpentine, oil of turpentine, any component of turpentine, and any combination of the above, such that the addition of the solvent formulation raises the flash point of the volatile organic solvent system; and
combining the solvent formulation with the volatile organic solvent system to create a solvent mixture comprising the solvent formulation and the volatile organic solvent system.

13. The method of claim 12, wherein the amount of the solvent formulation is about 20 wt % to about 30 wt % of the solvent mixture.

14. The method of claim 12, wherein the terpene is a monoterpene.

15. The method of claim 12, wherein the solvent formulation further comprises acetone.

16. The method of claim 15, wherein the amount of the terpene is about 0.1 wt % to about 50 wt % and the amount of acetone is about 50 wt % to about 99.9 wt % of the solvent formulation.

17. The method of claim 12, wherein the flash point of the solvent mixture is at least 30° F. higher than the flash point of the volatile organic solvent system.

18. The method of claim 12, wherein the volatile organic compound is selected from the group consisting of: acetone, parachlorobenzotrifluoride, tert-butyl acetate, dimethyl carbonate, ethyl lactate, xylene, methyl ethyl ketone, methanol, isopropanol, methyl acetate, methyl ester blend, soy methyl ester, and any combination of the above.

19. The solvent mixture of claim 1, wherein the volatile organic compound comprises acetone in an amount of about 15 wt % to about 87.5 wt % of the solvent mixture.

20. The solvent mixture of claim 2, wherein the solvent formulation consists essentially of the terpene component and acetone, and wherein the amount of the acetone is about 15 wt % to about 30 wt % of the solvent mixture.

21. The solvent mixture of claim 8, wherein the volatile organic compound comprises acetone in an amount of about 15 wt % to about 87.5 wt % of the solvent mixture.

22. The solvent mixture of claim 8, wherein the solvent formulation consists essentially of the terpene component and acetone, wherein the amount of the terpene component is about 0.005 wt % to about 5 wt % of the solvent mixture, and wherein the amount of the acetone is about 15 wt % to about 30 wt % of the solvent mixture.

23. The method of claim 12, wherein the volatile organic compound comprises acetone in an amount of about 15 wt % to about 87.5 wt % of the solvent mixture.

24. The method of claim 12 further comprising the step of mixing acetone with the at least one terpene to form the solvent formulation.

* * * * *